United States Patent
Sapozhnykov et al.

(10) Patent No.: US 11,700,473 B2
(45) Date of Patent: Jul. 11, 2023

(54) METHODS, APPARATUS AND SYSTEMS FOR AUTHENTICATION

(71) Applicant: Cirrus Logic International Semiconductor Ltd., Edinburgh (GB)

(72) Inventors: Vitaliy Sapozhnykov, Cheltenham (AU); Thomas Ivan Harvey, Northcote (AU); Brenton Potter, Croydon North (AU); David Watts, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 464 days.

(21) Appl. No.: 16/861,589

(22) Filed: Apr. 29, 2020

(65) Prior Publication Data

US 2020/0342082 A1  Oct. 29, 2020

Related U.S. Application Data

(60) Provisional application No. 62/839,979, filed on Apr. 29, 2019.

(51) Int. Cl.
  *G06F 21/00* (2013.01)
  *H04R 1/10* (2006.01)
  (Continued)

(52) U.S. Cl.
  CPC .......... *H04R 1/1041* (2013.01); *G06F 18/22* (2023.01); *G06F 21/32* (2013.01); *G06V 40/10* (2022.01);
  (Continued)

(58) Field of Classification Search
  CPC ... G06F 21/32; G06F 3/165; G10K 11/17823; G10K 11/1783; G10K 2210/1081;
  (Continued)

(56) References Cited

U.S. PATENT DOCUMENTS 5,787,187 A    7/1998  Bouchard et al.
9,706,304 B1 *  7/2017  Kelso .................. H03G 3/3005
(Continued)

FOREIGN PATENT DOCUMENTS

KR    20160099232 A    8/2016
WO    2006054205 A1    5/2006
(Continued)

OTHER PUBLICATIONS

Combined Search and Examination Report under Sections 17 and 18(3), UKIPO, Application No. GB1908803.8, dated Dec. 11, 2019.
(Continued)

*Primary Examiner* — Brandon Hoffman
*Assistant Examiner* — William A Corum, Jr.
(74) *Attorney, Agent, or Firm* — Jackson Walker L.L.P.

(57) ABSTRACT

Embodiments of the disclosure relate to methods, apparatus and systems for authentication of a user. The described embodiments relate to obtaining ear biometric data for a user to be authenticated. The ear biometric data comprises one or more features characteristic of the user's ear canal and an associated fit metric indicative of a positioning of a personal audio device relative to the user's ear canal, the personal audio device comprising a transducer for application of acoustic stimulus to the user's ear to obtain the ear biometric data. The user may be identified as a particular authorised user based on one or more features and the associated fit metric.

19 Claims, 9 Drawing Sheets

(51) Int. Cl.
  *G06F 21/32* (2013.01)
  *G06F 18/22* (2023.01)
  *G06V 40/10* (2022.01)

(52) U.S. Cl.
  CPC ....... *H04R 1/1091* (2013.01); *H04R 2460/15* (2013.01)

(58) Field of Classification Search
  CPC .......... G10K 2210/3055; H04R 1/1041; H04R 1/028; H04R 29/00; G10L 25/51
  See application file for complete search history.

(56) References Cited

U.S. PATENT DOCUMENTS

| | | | |
|---|---|---|---|
| 2008/0262382 A1 | 10/2008 | Akkermans et al. | |
| 2009/0061819 A1 | 3/2009 | Coughlan et al. | |
| 2009/0083850 A1* | 3/2009 | Fadell | H04L 9/3231 726/19 |
| 2015/0161459 A1* | 6/2015 | Boczek | G06V 40/10 382/115 |
| 2017/0214997 A1 | 7/2017 | Kaller et al. | |
| 2017/0347180 A1* | 11/2017 | Petrank | G06F 3/165 |
| 2018/0096120 A1* | 4/2018 | Boesen | H04R 1/1016 |
| 2018/0376234 A1* | 12/2018 | Petrank | H04R 1/1083 |
| 2019/0012445 A1 | 1/2019 | Lesso et al. | |
| 2019/0012446 A1 | 1/2019 | Lesso | |
| 2019/0095653 A1 | 3/2019 | Kurosawa | |
| 2019/0189129 A1* | 6/2019 | Arakawa | G10L 25/06 |
| 2019/0306613 A1* | 10/2019 | Qian | H04R 5/04 |

FOREIGN PATENT DOCUMENTS

| | | |
|---|---|---|
| WO | 2014061578 A1 | 4/2014 |
| WO | 2018213746 A1 | 11/2018 |
| WO | 2018034178 A1 | 6/2019 |
| WO | 2018198310 A1 | 2/2020 |

OTHER PUBLICATIONS

Combined Search and Examination Report under Sections 17 and 18(3), UKIPO, Application No. GB1908799.8, dated Nov. 20, 2019.
Combined Search and Examination Report under Sections 17 and 18(3), UKIPO, Application No. GB1908804.6, dated Dec. 11, 2019.
Combined Search and Examination Report under Sections 17 and 18(3), UKIPO, Application No. GB1908797.2, dated Nov. 14, 2019.

* cited by examiner

METHODS, APPARATUS AND SYSTEMS FOR AUTHENTICATION

The present disclosure claims priority to U.S. Provisional Patent Application Ser. No. 62/839979, filed Apr. 29, 2019, which is incorporated by reference herein in its entirety.

TECHNICAL FIELD

Embodiments of the disclosure relate to methods, apparatus and systems for authentication of a user. Some embodiments relate to methods, apparatus and systems for authentication of a user based on ear biometric data. Some embodiments relate to methods, apparatus and systems for enrolment of a user to determine biometric data characteristic of that user.

BACKGROUND

It is known that the acoustic properties of a user's ear, whether the outer parts (known as the pinna or auricle), the ear canal or both, differ substantially between individuals and can therefore be used as a biometric to identify the user. One or more loudspeakers or similar transducers positioned close to or within the ear generate an acoustic stimulus, and one or more microphones similarly positioned close to or within the ear detect the acoustic response of the ear to the acoustic stimulus. One or more features may be extracted from the response signal, and used to characterize an individual.

For example, the ear canal is a resonant system, and therefore one feature which may be extracted from the response signal is the resonant frequency of the ear canal. If the measured resonant frequency (i.e. in the response signal) differs from a stored resonant frequency for the user, a biometric algorithm coupled to receive and analyse the response signal may return a negative result. Other features of the response signal may be similarly extracted and used to characterize the individual. For example, the features may comprise one or more mel frequency cepstrum coefficients. More generally, the transfer function between the acoustic stimulus and the measured response signal (or features of the transfer function) may be determined, and compared to a stored transfer function (or stored features of the transfer function) which is characteristic of the user.

Ear biometric authentication has some useful properties. For example, conventional biometric authentication, such as through detection and verification of a person's voice or fingerprint, may inform an electronic device as to the person who requested authentication; however, it may provide no information as to who continues to use the device after authentication. Fingerprint authentication will provide no further information once the user's finger is removed from the fingerprint sensor. Voice biometric authentication, even if continually active, will provide no information unless the user is actually speaking. Ear biometric authentication, uniquely, informs an electronic device as to who is listening to audio playback from the electronic device.

One problem faced by biometric algorithms is the need to achieve acceptable performance in two respects. First, the algorithm should provide acceptable security so that unauthorised users are not falsely recognized as authorised users. The likelihood that the algorithm will accept an access attempt by an unauthorised user is known as the false acceptance rate (FAR), and should be kept low if the algorithm is to provide reasonable security. Second, the algorithm should work reliably, so that authorised users are not falsely rejected as unauthorised. The likelihood that the algorithm will reject an access attempt by an authorised user is known as the false rejection rate (FRR), and should also be kept low if the algorithm is not to prove frustrating for authorised users seeking authentication. The problem is that these two performance requirements conflict with each other. A low FRR can be achieved by relaxing the requirements for a user to achieve authentication. However, this will also have the consequence of increasing the FAR. Conversely, a low FAR can be achieved by making the requirements for a user to achieve authentication stricter. However, this will have the consequence of increasing the FRR.

SUMMARY

According to one aspect of the present disclosure, there is provided a method for authenticating a user, the method comprising: obtaining ear biometric data for a user to be authenticated, the ear biometric data comprising one or more features characteristic of the user's ear canal and an associated fit metric indicative of a positioning of a personal audio device relative to the user's ear canal, the personal audio device comprising a transducer for application of acoustic stimulus to the user's ear to obtain the ear biometric data; and identifying the user as a particular authorised user based on one or more features and the associated fit metric. For example, the method may be operable in a biometric system, such as a biometric authentication system.

In some embodiments, obtaining ear biometric data for the user to be authenticated may comprise initiating one or more acoustic stimulus for application to the user's ear; and extracting the one or more features from a measured response to each of the one or more acoustic stimulus. For example, extracting the one or more features from the measured response may comprise extracting at least one feature from a transfer function between the acoustic stimulus and the measured response.

In some embodiments, the fit metric may be determined from the measured response or from the extracted one or more features, or from a signal received from an accelerometer, gyroscope, a magnetometer and/or an in-ear detect module.

Identifying the user as a particular authorised user based on the one or more features and the associated fit metric may comprise determining a target user model set from a plurality of target user model sets based on the fit metric, each target user model set being associated with a particular fit metric of a set of fit metrics and comprising at least one target user model; and determining that at least one of the one or more features is sufficiently similar to a corresponding target user model of the determined target user model set. For example, determining that the at least one feature is sufficiently similar to the corresponding target user model may comprise determining that a relation between the at least one feature and the target user model exceeds a similarity threshold value.

In some embodiments, identifying the user as a particular authorised user based on the one or more features and the associated fit metric may comprise determining that at least one feature of the one or more features is sufficiently dissimilar to a corresponding non-target user model. For example, determining that the at least one feature is sufficiently dissimilar to a corresponding non-target user model may comprise determining a relation between the at least one feature and the non-target user model exceeds a dissimilarity threshold value. The relation may comprise one of: (i) ratio; (ii) logarithmic difference; (iii) cosine similarity; (iv) log-likelihood and conditional probability; (v) cross entropy; and (vi) mutual information.

In some embodiments, identifying the user as a particular authorised user based on the one or more features and the associated fit metric may comprise: determining a target user model set from a plurality of target user model sets based on the fit metric, each target user model set being associated with a particular fit metric of a set of fit metrics and comprising at least one target user model; determining one or more target user similarity scores indicative of the similarity of the one or more features to a corresponding target user model of the determined target user model set; determining a non-target user model set from a plurality of non-target user model sets based on the fit metric, each non-target user model set being associated with a particular fit metric of a set of fit metrics and comprising a plurality of non-target user models; determining a plurality of non-target user similarity scores, each indicative of the similarity of the one or more features to a respective non-target user model of the plurality of the non-target user model of the determined target user model set; and adjusting the one or more target user similarity scores based on the plurality of non-target user similarity scores.

In some embodiments, identifying the user as a particular authorised user based on the one or more features and the associated fit metric comprises: providing the one or more features and the associated fit metric as an input to a trained machine learning model; wherein the trained machine learning model is configured to: determine a score indicative of the relative similarity of the extracted one or more feature(s) to respective feature(s) of target models of a target user model set associated with the particular fit metric; and output a biometric result based on the score. The biometric result may comprise successful or unsuccessful authentication. The machine learning model may be trained using deterministic or probabilistic linear discriminant analysis, gaussian mixture model, support vector machine, and neural network.

According to another aspect of the present disclosure, there is provided a method of enrolling a user in a biometric authentication system, the method comprising: obtaining ear biometric data for a user to be enrolled in the biometric authentication system, the ear biometric data comprising one or more features characteristic of the user's ear canal and an associated fit metric, the fit metric being indicative of a positioning of a personal audio device relative to the user's ear canal, the personal audio device comprising a transducer for application of acoustic stimulus to the user's ear to obtain the ear biometric data; and determining a plurality of target user model sets based on the ear biometric data, each target user model set being associated with a particular fit metric of a set of fit metrics and each target user model set comprising one or more target user models based on respective one or more features for the particular fit metric.

The biometric data may comprise one or more features characteristic of the user's ear canal and an associated fit metric for each of a plurality of fit metrics, and wherein at least one of the plurality of fit metrics corresponds with the fit metrics of the set of fit metrics.

In some embodiments, obtaining ear biometric data for the user to be authenticated may comprise instructing the user to selectively position a personal audio device relative to the user's ear canal in accordance with one or more fit metrics; and for each of the selected positions, initiating one or more acoustic stimulus for application to the user's ear, extracting the one or more features from a measured response to each of the one or more acoustic stimulus, and determining the associated fit metric. In some embodiments, feedback is provided to the user to guide the user to position the personal audio device relative to the user's ear canal in accordance with the one or more fit metrics.

Extracting the one or more features from the measured response may comprise extracting one or more features from a transfer function between the acoustic stimulus and the measured response. The fit metric may be determined from the measured response or from the extracted one or more features or from a signal received from an accelerometer, gyroscope, a magnetometer, and/or an in-ear detect module.

In some embodiments, at least one of the target user models may be derived from one or more features extracted from the measure response. One or more of the target user models for a target user model set may be a synthetic target user model. For example, the synthetic target model may be derived from one or more target user models of one or more other target user model sets.

In some embodiments, the ear biometric data may comprise a plurality of estimates of the one or more features for the associated fit metric, and the method may further comprise determining one or more enrolment sets based on the ear biometric data, each of the one or more enrolment sets comprising the plurality of estimates of the one or more features for a particular fit metric; and determining the one or more target user models of the target user model set for each fit metric based on the enrolment set for the associated fit metric. Determining the one or more target user models for each fit metric based on the enrolment set for the associated fit metric may comprise determining a mean and standard deviation of the plurality of estimates of the one or more features.

The at least one feature may comprise one of: (i) resonant frequency of the user's ear; and (ii) the frequency response of the user's ear at one or more predetermined frequencies, or across one or more ranges of frequencies. The at least one feature may be characteristic of one or more of: (i) the user's ear canal depth; (ii) the user's eardrum impedance; (iii) user's ear canal shape; (iv) ear canal diameter; (v) ear canal size, for example, at the first and second bend and isthmus; (vi) length, distance and angle of first and second bend to eardrum. The fit metric may comprise one or more of: (i) insertion depth, (ii) rotation or orientation angle (azimuth, elevation), (iii) leakage or seal area, and (iv) degree of blocking pressure relief port (device's port blockage).

In another aspect of the disclosure, there is provided a biometric authentication apparatus, comprising: a biometric module for performing a biometric process, a stimulus module for generation of an acoustic stimulus, a transducer for application of the acoustic stimulus to a user's ear, a microphone for detecting a response signal of the user's ear to the acoustic stimulus, a feature extraction module for extracting from the response signal one or more features characteristic of the user's ear canal for use in a biometric process, a fit measure module for determining a fit metric associated with the one or more features, wherein the biometric module is configured to identify the user as a particular authorised user based on the one or more features and the associated fit metric.

According to one aspect of the present disclosure, there is provided a method for authenticating a user, the method comprising: obtaining ear biometric data for a user to be authenticated, the ear biometric data comprising one or more features characteristic of the user's ear canal and an associated fit metric indicative of a positioning of a personal audio device relative to the user's ear canal, the personal audio device comprising a transducer for application of acoustic stimulus to the user's ear to obtain the ear biometric data; and identifying the user as a particular authorised user based on one or more features and the associated fit metric. For example, the method may be operable in a biometric system, such as a biometric authentication system.

In another aspect of the disclosure, there is provided an electronic apparatus, comprising processing circuitry and a non-transitory machine-readable medium storing instructions which, when executed by the processing circuitry, cause the electronic apparatus to perform any one of the described methods. The electronic apparatus may comprise a personal audio device, or a host electronic device. The electronic apparatus may comprise a personal audio device having at least one transducer for the generation of the acoustic stimulus, and at least one microphone for the detection of the response signal. The electronic apparatus may comprise at least one of a smartphone, an audio player, a headphone, an earphone and a mobile or cellular phone.

In another aspect of the disclosure, there is provided a non-transitory machine-readable medium storing instructions which, when executed by processing circuitry of an electronic apparatus, cause the electronic apparatus to perform any one of the described methods.

DETAILED DESCRIPTION

Figure 1A:
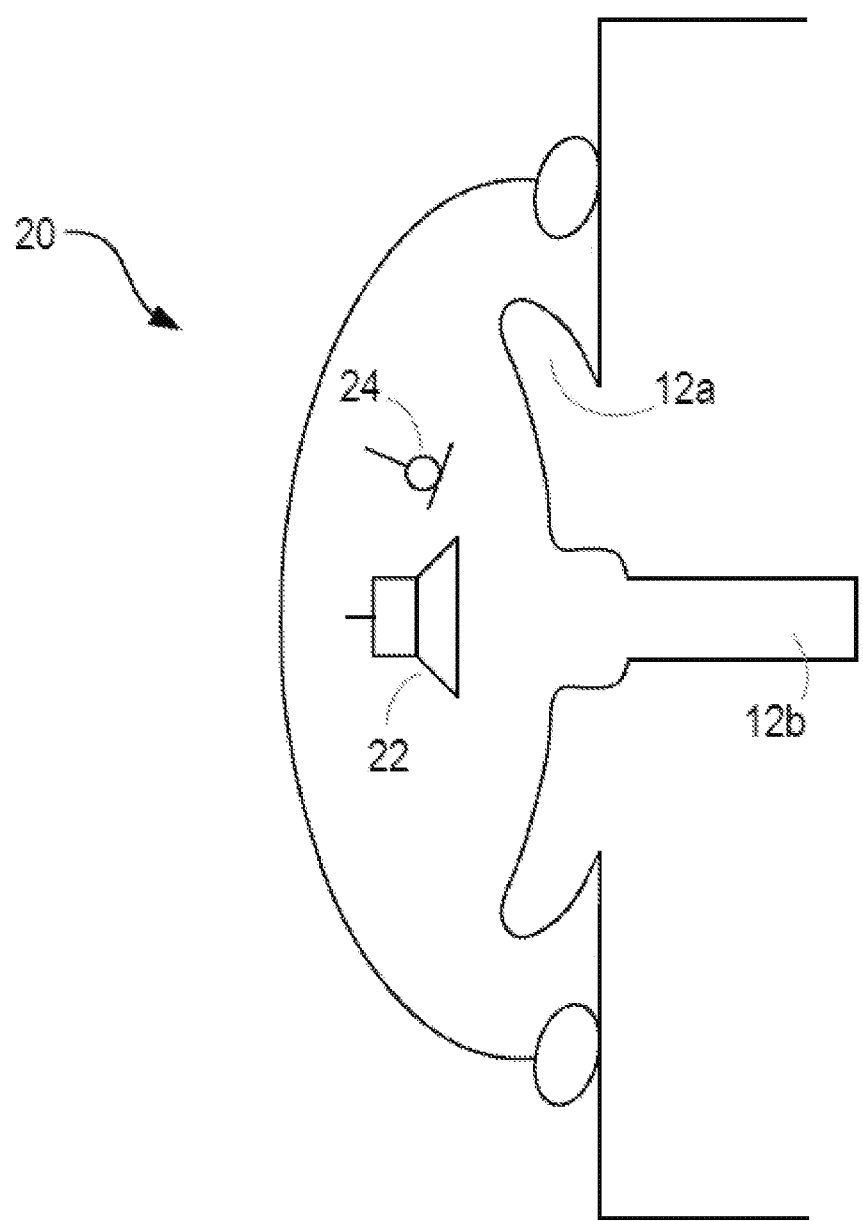
FIG. 1a shows a personal audio device according to one configuration.

Embodiments of the disclosure relate to methods, apparatus and systems for authentication of a user based on ear biometric data. Further embodiments of the disclosure relate to methods, apparatus and systems for enrolment of a user to determine biometric data characteristic of that user.

More specifically, embodiments of the disclosure relate to authentication of a user based on biometric data that comprises one or more features characteristic of the user's ear canal as well as an associated fit metric. For example, the fit metric may be indicative of a positioning of a personal audio device, such as an earbud, relative to the user's ear canal. The inventors have recognised that personal audio device fit, and more specifically, the positioning of the transducer that applies the acoustic stimulus to the user's ear and the microphone that acquires a response to the acoustic stimulus to obtain the ear biometric data, plays a role in the target user model or ear print determined. A feature, X, characteristic of the user's ear canal, is not only a function of parameters characterising the ear canal, but is also a function of a fit metric; the way the personal audio device is positioned relative to the ear canal, such that $$X=f(D,T)+N$$

where f(.) is some function, D is a set of parameters characterizing ear canal (e.g. ear canal depth, eardrum impedance, etc.), N is additive white Gaussian noise, and T is a fit metric that defines possible changes in the feature X due to factors other than ear canal, such as earbud insertion depth, L, earbud orientation angle $\Theta$, etc.. The term D is sometimes called a latent identity variable, and it is a pure representation of identity which contains no noise or nuisance factors. Therefore, D is a pure representation of identity, whereas T represents irrelevant extrinsic factors such as ear canal response capture conditions/fit. The term "latent" means that although the variable D explains user's identity it cannot be directly measured (observed) since measurement process is noisy (factor N) and depends on fit (factor T).

Accordingly, described embodiments for enrolling a target user (genuine user G) in a biometric system involves determining a set of estimates or measurements (N estimates) of feature X characteristic of the user for a set of fit metrics $T_i$, where $X_i=f(D,T_i)$, and determining a set of likelihood functions or target user models $P(X|C=G, T_i)=\{P(X|C="G", T_1), P(X|C="G", T_2), P(X|C="G", T_N)\}$, at least one for each fit metric.

Described embodiments for authenticating a user involve extracting a feature and fit metric pair $(X_i, T_i)$, for example, from a probing session, and using $T_i$, to select a model distribution from the set $\{P(X|C="G", T_i)\}$. The extracted feature is compared with the selected model to authenticate the user.

Described embodiments provide for improved methods, apparatus and system for biometric authentication which mitigates vulnerability to earbud fit and improves biometric authentication performance.

As noted above, ear biometric data may be acquired by the generation of an acoustic stimulus, and the detection of an acoustic response of the ear to the acoustic stimulus. One or more features may be extracted from the response signal, and used to characterize the individual. The acoustic response of the ear may relate to the acoustic transfer function of the ear, and/or otoacoustic emissions from the ear. Alternatively or additionally, otoacoustic emissions may be spontaneous, and detected without any requirement for an acoustic stimulus.

The acoustic stimulus may be generated and the response measured using a personal audio device. As used herein, the term "personal audio device" is any electronic device which is suitable for, or configurable to, provide audio playback substantially to only a single user. Some examples of suitable personal audio devices are shown in FIGS. 1a to 1e.

FIG. 1a shows a schematic diagram of a user's ear, comprising the (external) pinna or auricle 12a, and the (internal) ear canal 12b. A personal audio device 20 comprising a circum-aural headphone is worn by the user over the ear. The headphone comprises a shell which substantially surrounds and encloses the auricle, so as to provide a physical barrier between the user's ear and the external environment. Cushioning or padding may be provided at an edge of the shell, so as to increase the comfort of the user, and also the acoustic coupling between the headphone and the user's skin (i.e. to provide a more effective barrier between the external environment and the user's ear).

The headphone comprises one or more loudspeakers 22 positioned on an internal surface of the headphone, and arranged to generate acoustic signals towards the user's ear and particularly the ear canal 12b. The headphone further comprises one or more microphones 24, also positioned on the internal surface of the headphone, arranged to detect acoustic signals within the internal volume defined by the headphone, the auricle 12a and the ear canal 12b.

The headphone may be able to perform active noise cancellation, to reduce the amount of noise experienced by the user of the headphone. Active noise cancellation operates by detecting a noise (i.e. with a microphone), and generating a signal (i.e. with a loudspeaker) that has the same amplitude as the noise signal but is opposite in phase. The generated signal thus interferes destructively with the noise and so lessens the noise experienced by the user. Active noise cancellation may operate on the basis of feedback signals, feedforward signals, or a combination of both. Feedforward active noise cancellation utilizes one or more microphones on an external surface of the headphone, operative to detect the environmental noise before it reaches the user's ear. The detected noise is processed quickly, and the cancellation signal generated so as to match the incoming noise as it arrives at the user's ear. Feedback active noise cancellation utilizes one or more error microphones positioned on the internal surface of the headphone, operative to detect the combination of the noise and the audio playback signal generated by the one or more loudspeakers. This combination is used in a feedback loop, together with knowledge of the audio playback signal, to adjust the cancelling signal generated by the loudspeaker and so reduce the noise. The microphone 24 shown in FIG. 1a may therefore form part of an active noise cancellation system, for example, as an error microphone.

Figure 1B:
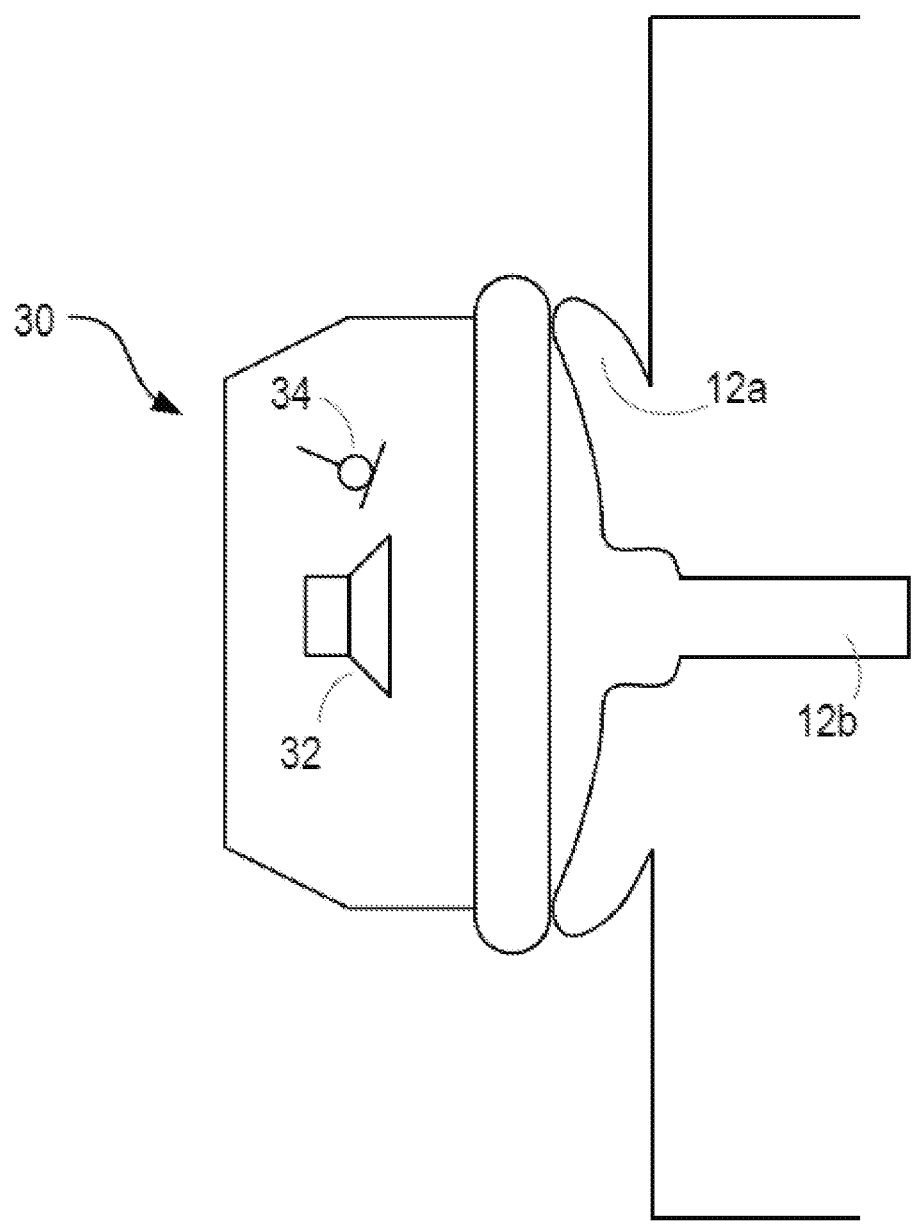
FIG. 1b shows a personal audio device according to another configuration.

FIG. 1b shows an alternative personal audio device 30, comprising a supra-aural headphone. The supra-aural headphone does not surround or enclose the user's ear, but rather sits on the auricle 12a. The headphone may comprise a cushion or padding to lessen the impact of environmental noise. As with the circum-aural headphone shown in FIG. 1a, the supra-aural headphone comprises one or more loudspeakers 32 and one or more microphones 34. The loudspeaker(s) 32 and the microphone(s) 34 may form part of an active noise cancellation system, with the microphone 34 serving as an error microphone.

Figure 1C:
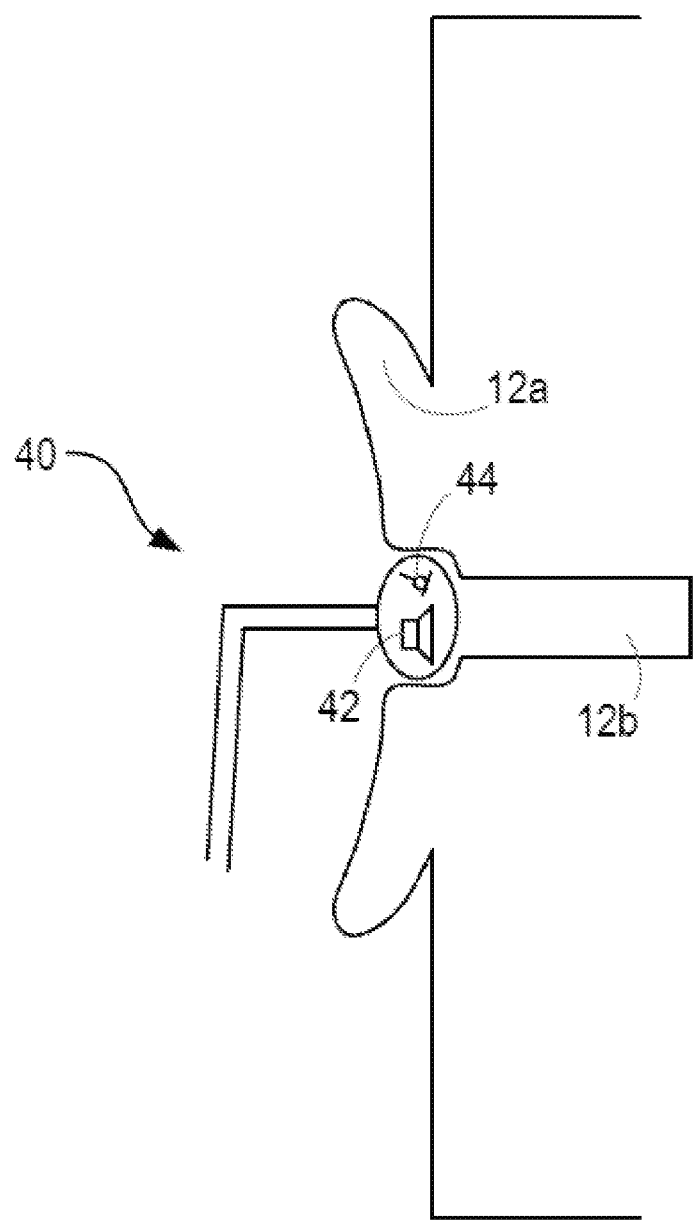
FIG. 1c shows a personal audio device according to another configuration.

FIG. 1c shows a further alternative personal audio device 40, comprising an intra-concha headphone (or earphone). In use, the intra-concha headphone sits inside the user's concha cavity. The intra-concha headphone may fit loosely within the cavity, allowing the flow of air into and out of the user's ear canal 12b.

As with the devices shown in FIGS. 1a and 1b, the intra-concha headphone comprises one or more loudspeakers 42 and one or more microphones 44, which may form part of an active noise cancellation system.

Figure 1D:
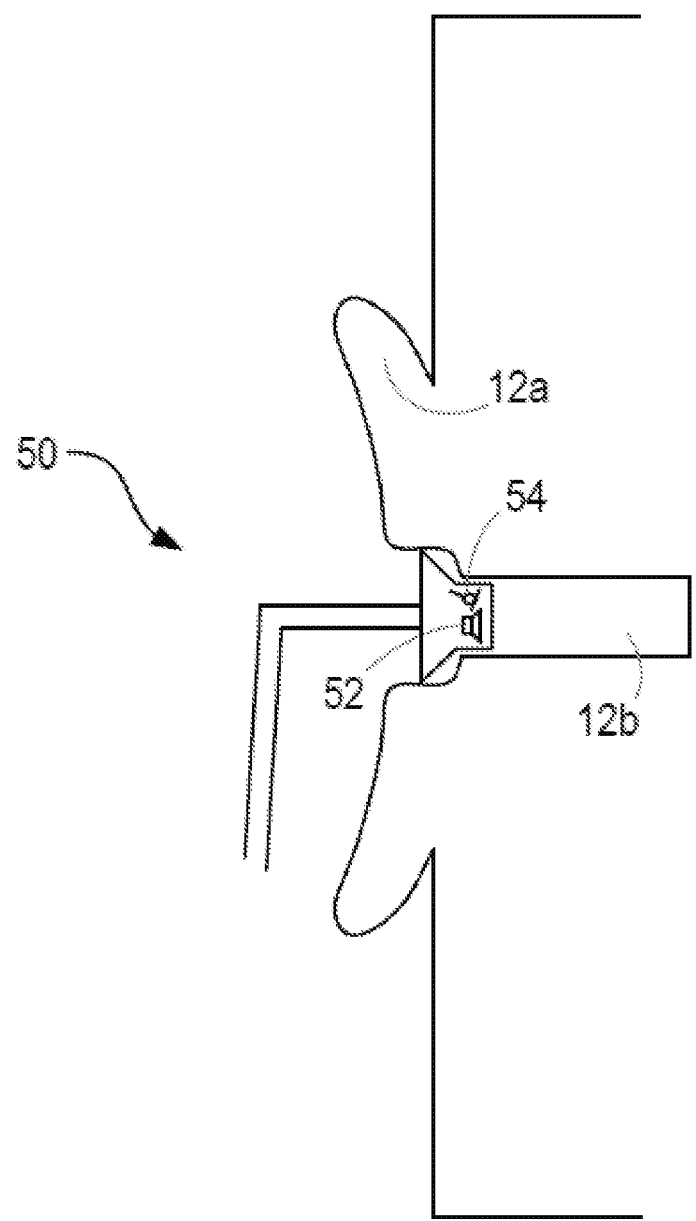
FIG. 1d shows a personal audio device according to another configuration.

FIG. 1d shows a further alternative personal audio device 50, comprising an in-ear headphone (or earphone), insert headphone, or earbud. This headphone is configured to be partially or totally inserted within the ear canal 12b, and may provide a relatively tight seal between the ear canal 12b and the external environment (i.e. it may be acoustically closed or sealed). The headphone may comprise one or more loudspeakers 52 and one or more microphones 54, as with the others devices described above, and these components may form part of an active noise cancellation system.

As the in-ear headphone may provide a relatively tight acoustic seal around the ear canal 12b, external noise (i.e. coming from the environment outside) detected by the microphone 54 is likely to be low.

Figure 1E:
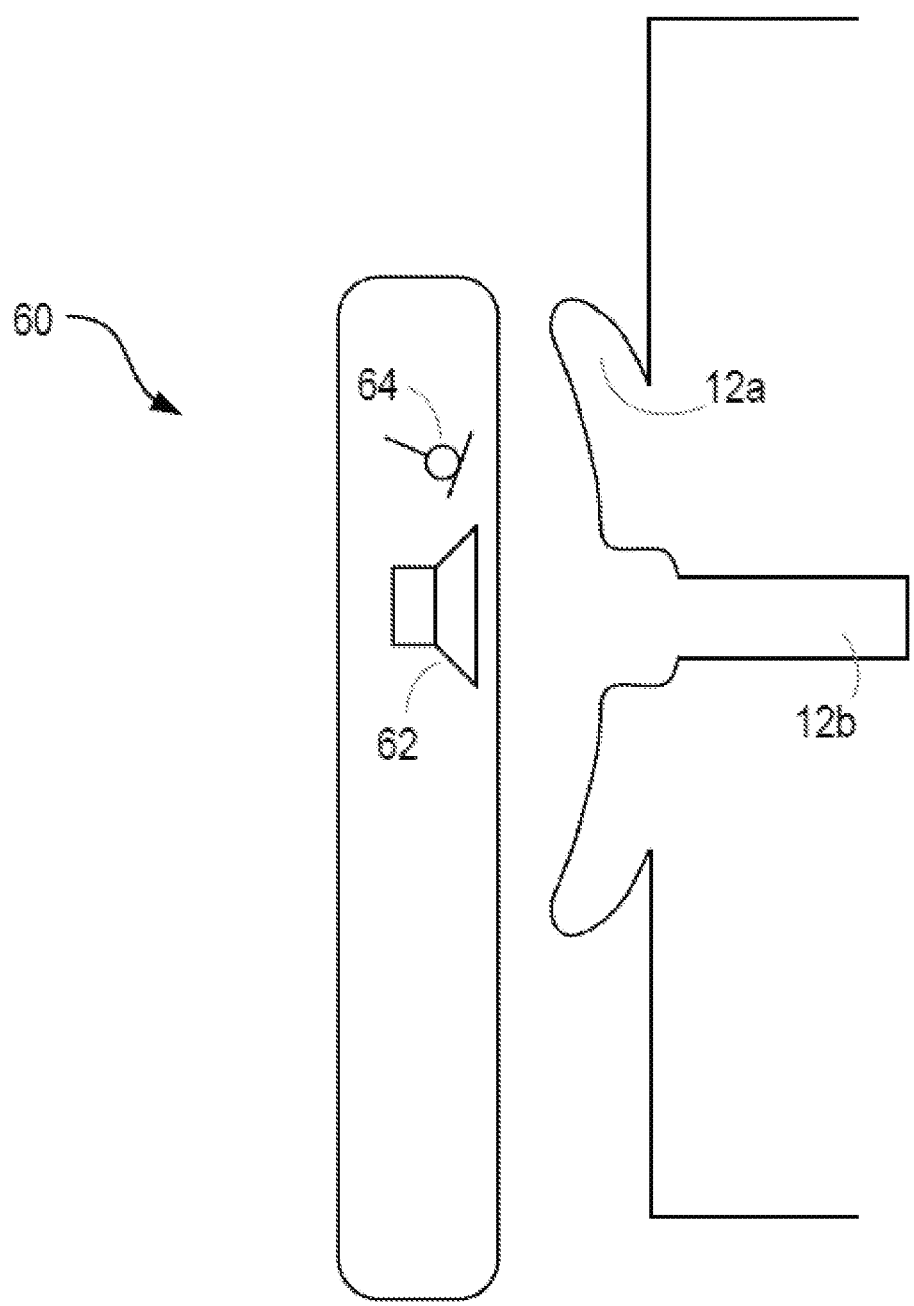
FIG. 1e shows a personal audio device according to another configuration.

FIG. 1e shows a further alternative personal audio device 60, which is a mobile or cellular phone or handset. The handset 60 comprises one or more loudspeakers 62 for audio playback to the user, and one or more microphones 64 which are similarly positioned.

In use, the handset 60 is held close to the user's ear so as to provide audio playback (e.g. during a call). While a tight acoustic seal is not achieved between the handset 60 and the user's ear, the handset 60 is typically held close enough that an acoustic stimulus applied to the ear via the one or more loudspeakers 62 generates a response from the ear which can be detected by the one or more microphones 64. As with the other devices, the loudspeaker(s) 62 and microphone(s) 64 may form part of an active noise cancellation system.

All of the personal audio devices described above thus provide audio playback to substantially a single user in use. Each device comprises one or more loudspeakers and one or more microphones, which may be utilized to generate biometric data related to the frequency response of the user's ear. The loudspeaker is operable to generate an acoustic stimulus, or acoustic probing wave, towards the user's ear, and the microphone is operable to detect and measure a response of the user's ear to the acoustic stimulus, e.g. to measure acoustic waves reflected from the ear canal or the pinna. The acoustic stimulus may be sonic (for example in the audio frequency range of say 20 Hz to 20 kHz) or ultra-sonic (for example greater than 20 kHz or in the range 20 kHz to 50 kHz) or near-ultrasonic (for example in the range 15 kHz to 25 kHz) in frequency. In some examples the microphone signal may be processed to measure received signals of the same frequency as that transmitted.

Another biometric marker may comprise otoacoustic noises emitted by the cochlear in response to the acoustic stimulus waveform. The otoacoustic response may comprise a mix of the frequencies in the input waveform. For example if the input acoustic stimulus consists of two tones at frequencies f1 and f2, the otoacoustic emission may include a component at frequency 2*f1−f2. The relative power of frequency components of the emitted waveform has been shown to be a useful biometric indicator. In some examples therefore the acoustic stimulus may comprise tones of two or more frequencies and the amplitude of mixing products at sums or differences of integer-multiple frequencies generated by otoacoustic emissions from the cochlear may be measured. Alternatively, otoacoustic emissions may be stimulated and measured by using stimulus waveforms comprising fast transients, e.g. clicks.

Depending on the construction and usage of the personal audio device, the measured response may comprise user-specific components, i.e. biometric data, relating to the auricle 12a, the ear canal 12b, or a combination of both the auricle 12a and the ear canal 12b. For example, the circum-aural headphones shown in FIG. 1a will generally acquire data relating to the auricle 12a and potentially also the ear canal 12b. The insert headphones shown in FIG. 1d will generally acquire data relating only to the ear canal 12b.

One or more of the personal audio devices described above (or rather, the microphones within those devices) may be operable to detect bone-conducted voice signals from the user. That is, as the user speaks, sound is projected away from the user's mouth through the air. However, acoustic vibrations will also be carried through part of the user's skeleton or skull, such as the jaw bone. These acoustic vibrations may be coupled to the ear canal 12b through the jaw or some other part of the user's skeleton or skull, and detected by the microphone. Lower frequency sounds tend to experience a stronger coupling than higher frequency sounds, and voiced speech (i.e. that speech or those phonemes generated while the vocal cords are vibrating) is coupled more strongly via bone conduction than unvoiced speech (i.e. that speech or those phonemes generated while the vocal cords are not vibrating). The in-ear headphone 50 may be particularly suited to detecting bone-conducted speech owing to the tight acoustic coupling around the ear canal 12b.

All of the devices shown in FIGS. 1a to 1e and described above may be used to implement aspects of the disclosure.

Figure 2:
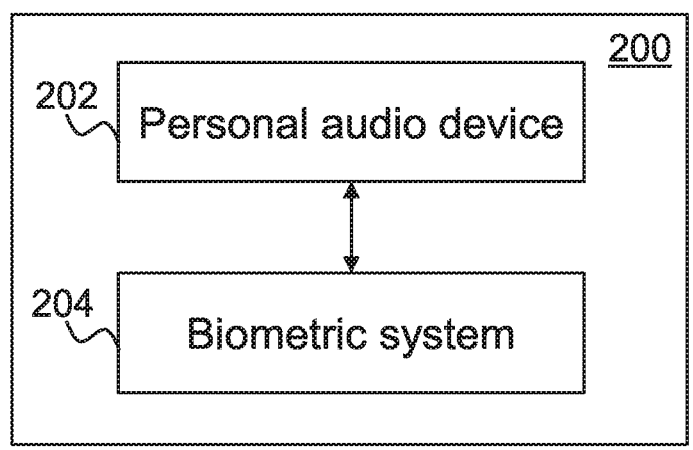
FIG. 2 is a flowchart of a method according to embodiments of the disclosure.

FIG. 2 shows an arrangement 200 according to embodiments of the disclosure. The arrangement 200 comprises a personal audio device 202 and a biometric system 204. The personal audio device 202 may be any device which is suitable for, or configurable to provide audio playback to substantially a single user. The personal audio device 202 generally comprises one or more loudspeakers, and one or more microphones which, in use, are positioned adjacent to or within a user's ear. The personal audio device may be wearable, and comprise headphones for each of the user's ears. Alternatively, the personal audio device may be operable to be carried by the user, and held adjacent to the user's ear or ears during use. The personal audio device may comprise headphones or a mobile phone handset, as described above with respect to any of FIGS. 1a to 1e.

The biometric system 204 is coupled to the personal audio device 202 and operative to control the personal audio device 202 to acquire biometric data which is indicative of the individual using the personal audio device.

The personal audio device 202 thus generates an acoustic stimulus for application to the user's ear, and detects or measures the response of the ear to the acoustic stimulus. For example, the acoustic stimulus may be in the sonic range, or ultra-sonic. In some embodiments, the acoustic stimulus may have a flat frequency spectrum over a relevant frequency range, or be pre-processed in such a way that those frequencies that allow for a good discrimination between individuals are emphasized (i.e. have a higher amplitude than other frequencies). The measured response corresponds to the reflected signal received at the one or more microphones, with certain frequencies being reflected at higher amplitudes than other frequencies owing to the particular response of the user's ear.

The biometric system 204 may send suitable control signals to the personal audio device 202, so as to initiate the acquisition of biometric data, and receive data from the personal audio device 202 corresponding to the measured response. The biometric system 204 is operable to extract one or more features from the measured response and utilize those features as part of a biometric process.

Some examples of suitable biometric processes include biometric enrolment and biometric authentication. Enrolment comprises the acquisition and storage of biometric data which is characteristic of an individual. In the present context, such stored data may be known as an "ear print" or template. Authentication (alternatively referred to as verification) comprises the acquisition of biometric data from an individual, and the comparison of that data to the stored ear prints of one or more enrolled or authorised users. A positive comparison (i.e. a determination that the acquired data matches or is sufficiently close to a stored ear print) results in the individual being authenticated. For example, the individual may be permitted to carry out a restricted action, or granted access to a restricted area or device. A negative comparison (i.e. a determination that the acquired data does not match or is not sufficiently close to a stored ear print) results in the individual not being authenticated. For example, the individual may not be permitted to carry out the restricted action, or granted access to the restricted area or device.

The biometric system 204 may, in some embodiments, form part of the personal audio device 202 itself. Alternatively, the biometric system 204 may form part of an electronic host device (e.g. an audio player) to which the personal audio device 202 is coupled, through wires or wirelessly. In yet further embodiments, operations of the biometric system 204 may be distributed between circuitry in the personal audio device 202 and the electronic host device.

Figure 3:
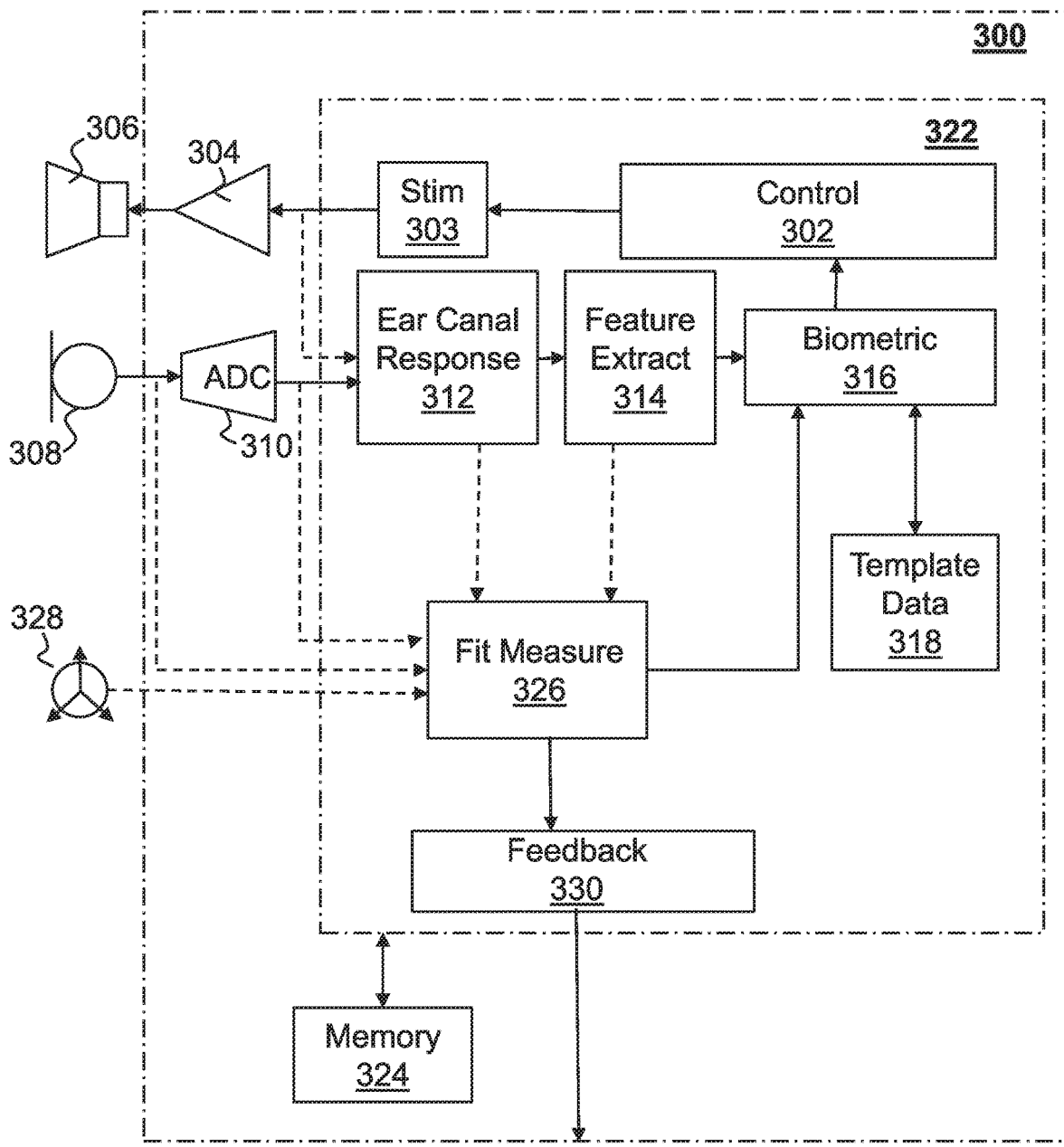
FIG. 3 is a schematic diagram of a biometric authentication system according to embodiments of the disclosure.

FIG. 3 shows a system 300 according to embodiments of the disclosure.

The system 300 comprises processing circuitry 322, which may comprise one or more processors, such as a central processing unit or an applications processor (AP), or a digital signal processor (DSP). The system 300 further comprises memory 324, which is communicably coupled to the processing circuitry 322. The memory 324 may store instructions which, when carried out by the processing circuitry 322, cause the processing circuitry to carry out one or more methods as described below (see FIGS. 4 and 5, for example). The one or more processors may perform methods as described herein on the basis of data and program instructions stored in memory 324. Memory 324 may be provided as a single component or as multiple components or co-integrated with at least some of processing circuitry 322. Specifically, the methods described herein can be performed in processing circuitry 322 by executing instructions that are stored in non-transient form in the memory 324, with the program instructions being stored either during manufacture of the system 300 or personal audio device 202 or by upload while the system or device is in use.

The processing circuitry 322 comprises a stimulus generator module 303 which is coupled directly or indirectly to an amplifier 304, which in turn is coupled to a loudspeaker 306.

The stimulus generator module 303 generates an electrical audio signal (for example, under the instruction of control module 302) and provides the electrical audio signal to the amplifier 304, which amplifies it and provides the amplified signal to the loudspeaker 306. The loudspeaker 306 generates a corresponding acoustic signal which is output to the user's ear (or ears). The audio signal may be sonic or ultra-sonic, for example. The audio signal may have a flat frequency spectrum, or be pre-processed in such a way that those frequencies that allow for a good discrimination between individuals are emphasized (i.e. have a higher amplitude than other frequencies).

As noted above, the audio signal may be output to all or a part of the user's ear (i.e. the auricle or the ear canal) and is reflected off the ear. The reflected signal thus comprises data which is characteristic of the individual's ear, and suitable for use as a biometric.

In some embodiments, the reflected signal (or echo signal) is detected and received by a microphone 308 as a measured response. The microphone 308 may be an internal, in-ear microphone or an external microphone, as may, for example, be provided on the personal audio device 202, such as the noise reference and voice microphone on the headset. Although the latter embodiment may not be suitable at all times during normal use as a result of it being sensitive to SNR, the leakage paths can provide additional information on how an earbud is fitting into, and sealing in, the concha of the user. The reflected signal is passed from the microphone 308 to an analogue-to-digital converter (ADC) 310, where it is converted from the analogue domain to the digital domain. Of course, in alternative embodiments the microphone may be a digital microphone and produce a digital data signal (which does not therefore require conversion to the digital domain).

In some embodiments, the loudspeaker 306 may be used both to generate the acoustic signal and as an input device to detect and measure the response to the acoustic signal. For example, the response may be estimated by measuring the current through the loudspeaker or transducer, or by calculating the impedance of the loudspeaker 306. Where appropriate, the measured response is passed to the analogue-to-digital converter (ADC) 310, where it is converted from the analogue domain to the digital domain. The measured response is detected by the microphone 308, or at the loudspeaker 306, in the time domain. The measured response is then input into the ear canal response module 312 where the stimulus and measured response are used to extract a user's ear canal impulse response. In some embodiments, the ear canal impulse response may be transformed into ear canal frequency response, or, alternatively, the ear canal frequency response may be estimated in the frequency (or any other suitable) domain. In some embodiments, the ear canal response may be estimated in the time domain. The ear canal response is then passed to a feature extract module 314, which extracts one or more features of the ear canal response for use in a biometric process (e.g. biometric enrolment, biometric authentication, etc). For example, the feature extract module 314 may extract the resonant frequency of the user's ear. For example, the feature extract module 314 may extract one or more cepstrum coefficients, or mel frequency cepstrum coefficients. Alternatively, the feature extract module may determine the frequency response of the user's ear at one or more predetermined frequencies, or across one or more ranges of frequencies. The extracted features may correspond to data for a model of the ear. To extract such features, the acoustic stimulus generated at the stimulus generator module 303 is also provided to the feature extract module 314. In some embodiments, the measured response is passed to the feature extract module 314, which extracts one or more features of the measured response for use in a biometric process (e.g. biometric enrolment, biometric authentication, etc). The extracted feature(s) are passed to a biometric module 316, which performs a biometric process on them as discussed in more detail below.

In some embodiments the stimulus waveforms may be tones of predetermined frequency and amplitude. In other embodiments, the stimulus waveform may be a "chirp" signal with frequency changing linearly or logarithmically. In other embodiments the stimulus generator may be configurable to apply music to the loudspeaker, e.g. normal playback operation, and the feature extract module may be configurable to extract the response or transfer function from whatever signal components the stimulus waveform contains.

According to embodiments of the disclosure, the system 300 further comprises a fit measure module 326, which is operative to determine one or more fit metrics indicative of a positioning of the loudspeaker 306 relative to the user's ear canal when the acoustic stimulus is applied to the user's ear to obtain the ear biometric data. The one or more fit metrics may be scalar or vector metrics. For example, the one or more fit metrics may comprise insertion depth, rotation or orientation angle (azimuth, elevation), leakage or seal area of an earbud, degree of blocking of pressure relief port or other ports/vents of the earbud.

In some embodiments, the stimulus generator module 303 generates a non-composite stimulus and the one or more features, and in some cases, the associated fit metrics, are extracted from the reflected signal, or measured response. In other embodiments, the stimulus generator module 303 generates a composite stimulus and the one or more features are extracted from a first part of the reflected signal and the associated fit metric is extracted from a second part. For example, the fit metric may be determined before or after the one or more features are extracted.

The one or more fit metrics may comprise one or more fit metrics which relate to the reflected signal or the measured response itself. Alternatively or additionally, the one or more fit metrics may comprise one or more metrics which relate to the extracted features (i.e. calculated based on the output of the feature extract module 314). Alternatively or additionally, the one or more fit metrics may comprise one or more metrics which relate to data acquired from a motion sensor such as an accelerometer 328, which may, for example, be disposed in an earbud to be inserted into the ear canal and/or may form part of the fit measure module 326. Alternatively or additionally, the one or more fit metrics may comprise one or more metrics which relate to data acquired from other motion sensors such as a gyroscope (not shown) and/or a magnetometer (not shown) either or both of which may, for example, be disposed in an earbud to be inserted into the ear canal and/or may form part of the fit measure module 326. Alternatively or additionally, the one or more fit metrics may comprise one or more metrics which relate to data acquired from an in-ear detect module (not shown) operable to determine a position of the loudspeaker 306 relative to the user's ear canal. For example, in-ear detect module (not shown) may be disposed in an earbud to be inserted into the ear canal, and/or may form part of the fit measure module 326. Various mechanisms are suitable for such a purpose. For example, a pressure sensor, for instance a piezo-resistive or piezo-electric sensor, may detect pressure exerted on an ear canal when an earbud is inserted into the ear canal.

The fit module 326 is thus coupled to receive signals corresponding to the output of one or more of: the microphone 308; the ADC 310; the ear canal response module 312; the feature extract module 314; the accelerometer 328; the gyroscope (not shown), the magnetometer (not shown), and the in-ear detect module (not shown); and to calculate one or more fit metrics based thereon. The one or more fit metrics are passed to the biometric module 316, which performs a biometric process on them.

In some embodiments, the one or more fit metrics may be determined from the extracted features (i.e. calculated based on the output of the feature extract module 314). For example, the fit metrics may be determined by determining that particular spectral peaks/troughs of the reflected signal have moved relative to corresponding spectral peaks/troughs of the stimulus signal and that the movement is characteristic of a particular fit metric.

In some embodiments, where a composite stimulus is applied, the one or more fit metrics may be based on a determined delay between a pulse of the stimulus signal and a corresponding pulse of the reflected signal, and/or based on a phase difference between the stimulus signal waveform and the reflected signal waveform.

The fit measure module 326 may determine one or more of the fit metrics based on statistical measures of distributions of the extracted feature(s) over time, for example arithmetic mean, geometric mean, standard deviation, skew, kurtosis, difference between median and mean, ratio of lower decile to standard deviation. These features may similarly be indicative of fit. For example, an extracted feature which is relatively small or large compared to its mean value or the standard deviation of its measured values, may be indicative of a poor fit.

According to embodiments of the disclosure, the biometric module 316 may perform a biometric enrolment, in which the extracted feature(s) (or parameters derived therefrom), characteristic of the individual, and associated fit metric(s) indicative of a positioning of the personal audio device 202 relative to the user's ear canal when the acoustic stimulus is applied to the user's ear to obtain the ear biometric data, are stored as part of biometric template data 318. During the biometric enrolment, the user may be provided with feedback to guide the repositioning of the personal audio device 202 relative to their ear canal to obtain the extracted feature(s) for various associated fit metric(s). For example, the fit measure module 326 may generate an output for a feedback module 330 instructing or guiding the user on how to reposition the personal audio device 202 relative to their ear canal. The feedback module 330 is operative to provide feedback to the user (e.g. through the speaker 306, or via a display).

The biometric data may be stored within the system 300 or remote from the system 300 (and accessible securely by the biometric module 316). The biometric template data 318 obtained at the enrolment state is used by the biometric module 316 during the authorisation process to determine whether extracted feature(s) belong to an authorised user.

In some embodiments, at least one feature(s) of the transformed signal is extracted for each fit metric of a set of fit metrics. In some embodiments, multiples of the at least one feature are extracted for each fit metric of the set of fit metrics. For example, where the set of fit metrics relates to insertion depth of the speaker within the ear canal, multiple measurements of the at least one feature may be extracted from each of a plurality of transformed signals, each transformed signal being derived from an acoustic stimulus applied at a respective insertion depths of a set of insertion depths (the set of fit metrics). Such determined data may be known as enrolment data. As discussed in more detail with respect to FIG. 5 below, the enrolment data may be used to derive a plurality of target user model sets, each target user model set being associated with a particular fit metric of the set of fit metrics, and comprising one or more target user models, templates, or "ear prints". For example, a target user template may be a simple form of a target user model.

According to embodiments of the disclosure, the biometric module 316 may perform a biometric verification or authentication process, in which the extracted feature(s) (or parameters derived therefrom), characteristic of the individual, and associated fit metric(s) are used to identify the individual. For example, the fit metric may be used to determine a target user model set from the plurality of target user model sets and the extracted feature(s) may be compared with respective feature(s) or target user models of the determined target user model set. In another example, the biometric module 316 may perform a biometric training process to determine a plurality of sets of non-target user models for the system 300 based on ear biometric data for non-target users or individuals enrolled in the system 300. The ear biometric data for each of the non-target users may comprise at least one feature characteristic of the non-target user's ear canal. In some embodiments, ear biometric data for each of the non-target users may comprise at least one feature characteristic of the non-target user's ear canal for each fit metric of the set of fit metrics. In the latter embodiment, each non-target user model set of the plurality of sets may be associated with a particular fit metric of the set of fit metrics and comprise at least one non-target user model based on the respective at least one feature for the particular fit metric. The plurality of sets of non-target user models can be used to classify a user as an authorised target user.

The biometric module 316 may generate a biometric result (which may be the successful or unsuccessful generation of an ear print, and/or successful or unsuccessful authentication) and output the result to control module 302. For example, the biometric module 316 may use a fit metric determined from the ear biometric data to determine a target user model from the sets of target user models and a non-target user model from the sets of non-target models and classify the user as an authorised or unauthorised user based on the target user model and non-target user model, using classification techniques, such as maximum likelihood estimate (MLE).

In some embodiments, the biometric module 316 comprises one or more trained models or classifiers configured to generate a biometric result (which may be the successful or unsuccessful authentication based on a generated similarity score) from an input based on extracted feature(s) (or parameters derived therefrom) characteristic of the individual, and associated fit metric(s). For example, the input may comprise a vector of extracted feature(s). Based on the input, the trained model may be configured to determine a similarity score indicative of the relative similarity of the extracted feature(s) to respective feature(s) of target models of a target user model set associated with the particular fit metric, and may for example, output the similarity score or an indication of successful or unsuccessful authentication. The classifier or model may be trained with machine learning methods, such as deterministic or probabilistic linear discriminant analysis, gaussian mixture model, support vector machine, and neural network.

The system 300 may be provided within a personal audio device (such as the personal audio device 202), or may be distributed across multiple devices. In the former case, all functional blocks other than the speaker 306 and the microphone 308 (and the accelerometer 328, gyroscope (not shown), magnetometer (not shown), and/or in-ear detect module (not shown), if present) may be provided on one or more integrated circuits. In the latter case, one or more (or all) of the functional blocks other than the speaker 306 and the microphone 308 (and the accelerometer 328 gyroscope (not shown), magnetometer (not shown), and/or in-ear detect module (not shown) if present) may be provided in a host electronic device (e.g. on one or more integrated circuits). In either case, the microphone may also be co-integrated with one or more functional blocks, such as one or more of the ADC 310, the ear canal response module 312, and the feature extract module 314.

Figure 4:
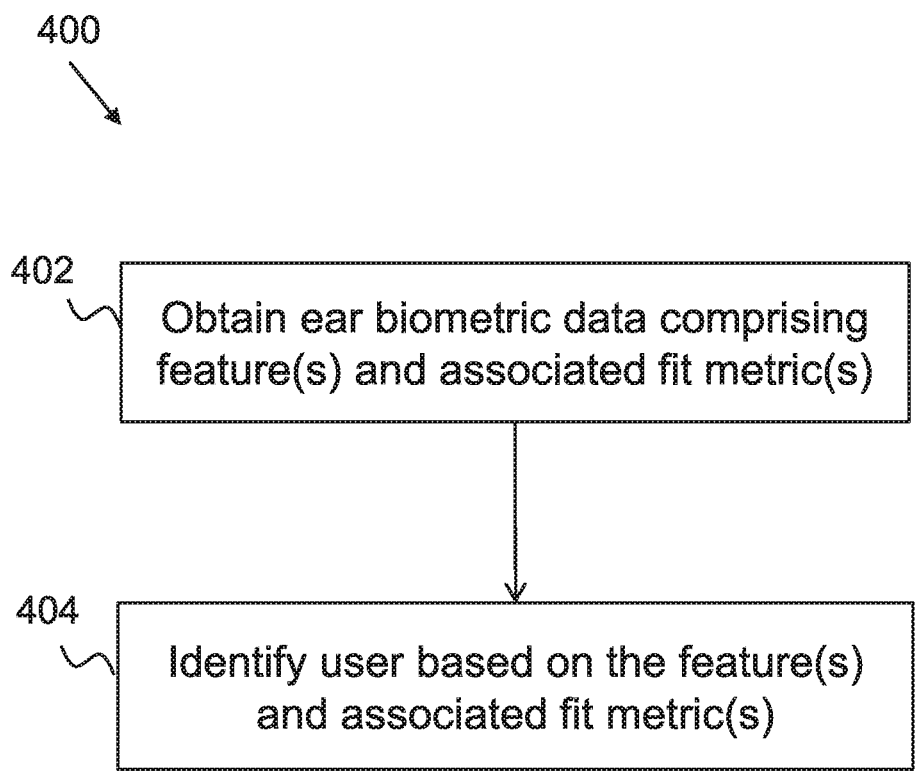
FIG. 4 is a flowchart of a method according to further embodiments of the disclosure.

Referring now to FIG. 4, there is shown a process flow diagram of a method 400 for authenticating a user according to embodiments of the disclosure. The method may be carried out in a biometric system, such as the system 204 or the system 300.

At 402, the biometric system 204, 300 obtains ear biometric data for the user. The ear biometric data comprises one or more features characteristic of the user's ear canal and an associated fit metric. The associated fit metric is indicative of a positioning of a personal audio device 202 relative to the user's ear canal for application of the acoustic stimulus to the user's ear to obtain the ear biometric data.

In some embodiments, the biometric system 204, 300 initiates generation of an acoustic stimulus towards an ear of the user to be authenticated in order to acquire the ear biometric data. The stimulus may be directed towards the outer part of the ear (i.e. the auricle), the ear canal, or both. The biometric system 204, 300 may extract the one or more features from the measured response signal to the acoustic stimulus. For example, the one or more features may be extracted from a transfer function between the acoustic stimulus and the measured response. The one or more features may comprise one or more of: the resonant frequency; the frequency response; and one or more mel frequency cepstral coefficients.

In some embodiments, the biometric system 204, 300 also obtains the associated fit metric indicative of the positioning of a personal audio device 202 relative to the user's ear canal for application of the acoustic stimulus to the user's ear to obtain the ear biometric data. The biometric system 204, 300 may determine the associated fit metrics from the measured response signal. The fit metrics may be calculated from the measured response signal itself (whether in the time domain or the frequency domain), or from the extracted at least one feature. Alternatively, or in addition, the biometric system 204, 300 may determine the associated fit metrics from the accelerometer 328, a gyroscope (not shown) and/or a magnetometer (not shown) and/or the in-ear detect module (not shown).

At 404, the biometric system 204, 300 identifies the user as a particular authorised user based on the one or more features and the associated fit metric.

In some embodiments, the biometric system 204, 300 determines a target user model set from a plurality of sets of target user models based on the fit metric. Each target user model set of the plurality of sets may be associated with a particular fit metric of a set of fit metrics and may comprise at least one target user model, template or ear print. For example, the target user model or ear print may be specific to a type of feature. The biometric system 204, 300 determines a target user model that corresponds with the extracted feature from the determined target user model set. Each target user model set may comprise multiple target user models, each target user model being associated with different features characteristic of the user's ear canal. In a case where multiple features are extracted from the measured response signal, the biometric system 204, 300 may determine a target user model for just one of the extracted features, may determine target user models for more than one of the extracted features or may determine target user models for all of the extracted features and the one or more models may be used for authenticating the user.

The biometric system 204, 300 may determine the user as a particular authorised user based on a comparison of the extracted feature(s) with the corresponding target user model(s). For example, the biometric system 204, 300 may compare the extracted feature(s) with the corresponding target user model(s) to determine if the extracted feature(s) is sufficiently similar to the target user model(s), such as whether a relation value between the extracted feature(s) and the corresponding target user model(s) exceeds a similarity threshold value. The relation value, may for example, comprises one of: (i) ratio; (ii) logarithmic difference; (iii) cosine similarity; (iv) log-likelihood and conditional probability; (v) cross entropy; and (vi) mutual information.

Where the target user model is more complex than a template or ear print, the biometric system 204, 300 may determine the likelihood (or probability) of the extracted feature being generated by the target user model and compare the determined likelihood with a threshold value to determine whether or not the user is an authorised user.

In some embodiments, the biometric system 204, 300 may determine the user as a particular authorised user based on a comparison of the extracted feature(s) with corresponding non-target user model(s) from a non-target user model set also associated with the particular fit metric. For example, the biometric system 204, 300 may compare the extracted feature(s) with the corresponding non-target user model(s) to determine if the extracted feature(s) is sufficiently dissimilar to the non-target user model(s), such as if a relation value between the extracted feature(s) and the corresponding non-target user model(s) exceeds a dissimilarity threshold value. Again, the relation value, may for example, comprises one of: (i) ratio; (ii) logarithmic difference; (iii) cosine similarity; (iv) log-likelihood and conditional probability; (v) cross entropy; and (vi) mutual information.

Where the target user model and non-target user models are more complex than a template or ear print, the biometric system 204, 300 may determine the likelihood of the extracted feature being generated by the target user model and the non-target user model; whichever likelihood is higher determines the outcome.

In some embodiments, the biometric system 204, 300 may determine the user as a particular authorised user based on a comparison of the extracted feature(s) with both target user model(s) from a target user model set associated with the particular fit metric and imposter (non-target user) model(s) from an imposter (non-target user) model set also associated with the particular fit metric (cohort normalisation). For example, the biometric system 204, 300 may determine a target user model set from a plurality of target user model sets based on the fit metric, where each target user model set is associated with a particular fit metric of a set of fit metrics and comprises at least one target user model. The biometric system 204, 300 may determine one or more target user similarity scores indicative of the similarity of the one or more features to a corresponding target user model of the determined target user model set. The biometric system 204, 300 may determine a non-target user, but plausible model set from a plurality of non-target user model sets based on the fit metric, where each non-target user model set is associated with a particular fit metric of a set of fit metrics and comprises a plurality of non-target user models. The biometric system 204, 300 may determine a plurality of non-target user similarity scores, each indicative of the similarity of the one or more features to a respective non-target user model of the plurality of the non-target user model of the determined target user model set. The biometric system 204, 300 may then adjust the one or more target user similarity scores based on the plurality of non-target user similarity scores. The biometric system 204, 300 may identify the user as a particular authorised user based on the one or more adjusted target user similarity scores.

Figure 5:
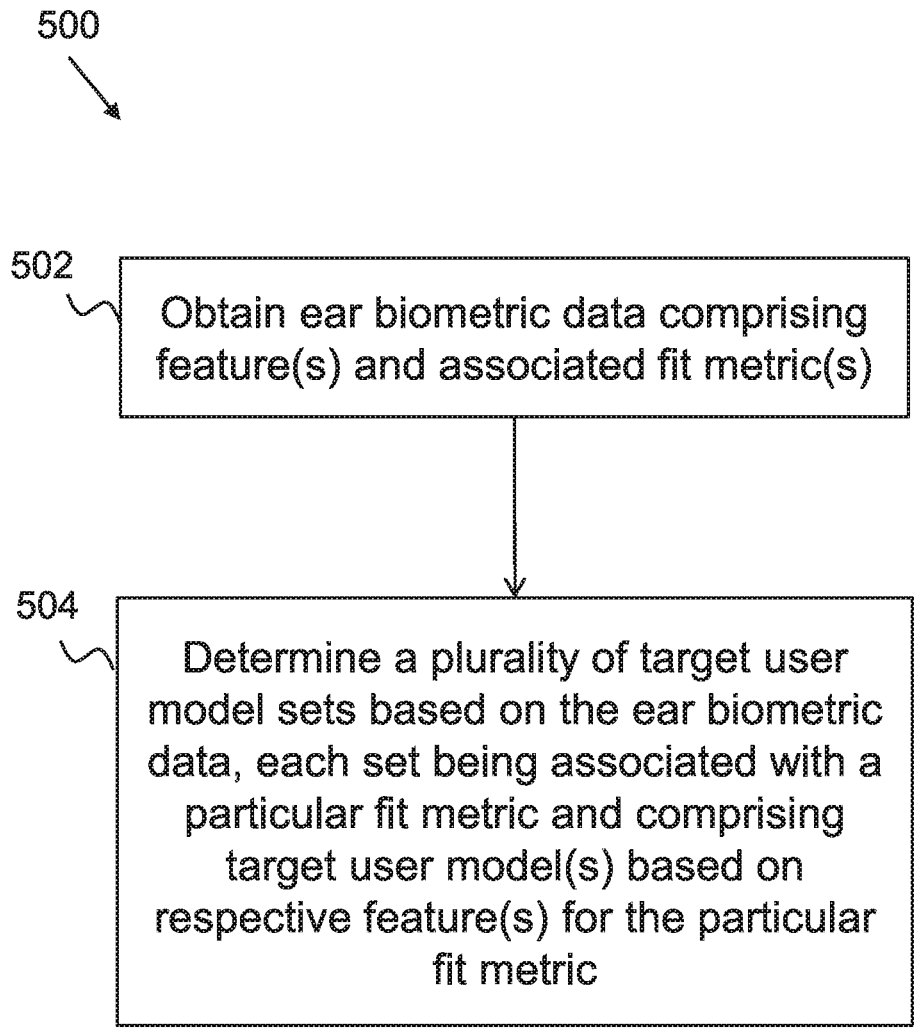
FIG. 5 is a flowchart of a method according to further embodiments of the disclosure.

Referring now to FIG. 5, there is shown a process flow diagram of a method 500 for enrolling a user in a biometric authentication system, according to embodiments of the disclosure. The method may be carried out in a biometric system, such as the system 204 or the system 300.

At 502, the biometric system 204, 300 obtains ear biometric data for a user to be enrolled in the system. The ear biometric data comprises one or more fit metrics indicative of a positioning of a speaker relative to the user's ear canal for application of acoustic stimulus to the user's ear to obtain the ear biometric data. The ear biometric data also comprises one or more measurements or estimates of at least one feature characteristic of the user's ear canal for each of the one or more fit metrics. For example, the ear biometric data may comprise one or a plurality of measurements of frequency response for a particular insertion depth of the speaker relative to the user's ear canal. In some embodiments, the biometric system 204, 300 may provide the user with feedback to guide the repositioning of the personal audio device 202 relative to their ear canal to obtain the extracted feature(s) for various associated fit metric(s).

At 504, the biometric system 204, 300 determines a plurality of target user model sets based on the ear biometric data. Each target user model set of the plurality of sets is associated with a particular fit metric of a set of fit metrics. Each target user model set comprises a target user model for each feature for the particular fit metric.

At least one target user model set comprises a target user model that is based on or derived from the one or more measurements or estimates of the feature at the particular fit metric. In some embodiments, one or more target user model sets or target user models associated with a particular fit metric of the set of fit metrics are estimated. In some embodiments, one or more target user model sets or target user models associated with particular fit metric of the set of fit metrics are derived from target user model sets or target user models associated with other fit metric of the set of fit metrics. For example, a target user model associated with fit metric $T_i$ may be derived from a target user model associated with fit metric $T_j$. Such estimated target user models may be referred to as "synthetic target user models".

In some embodiments, the personal audio device 202 is selectively positioned relative to the user's ear canal in accordance with a plurality of fit metrics of the set of fit metrics and for each of the selected positions (or fit instances), the biometric system 204, 300 initiates one or more acoustic stimulus for application to the user's ear, extracts the at least one feature from a measured response to each of the one or more acoustic stimulus and determines the associated fit metric of the set of fit metrics.

In some embodiments, where multiple estimates of the feature(s) are obtained for each fit metric, the biometric system 204, 300 determines an enrolment set based on the ear biometric data for each of the one or more fit metrics. Each enrolment set(s) comprises the estimates of the feature(s) for a particular fit metric. The biometric system 204, 300 then determines the target user model(s) of the target user model set for the fit metric(s) based on the enrolment set for the associated fit metric. For example, biometric system 204, 300 may determine the target user model(s) by determining a mean and standard deviation of the plurality of measurements of the at least one feature.

For illustrative purposes, an example enrolment process is described for creating a plurality of target user model sets, each being associated with a particular fit metric. In this example, the fit metric is a vector which includes an insertion depth parameter L and a rotation parameter, Theta Azimuth. Each target model user set includes a target user model for a first feature, resonance frequency. At the outset, L=1 mm and Theta=45 degrees. The user is guided via the feedback module 330 to position the personal audio device 202 in the correct position to achieve the specific fit metric. An acoustic stimulus is emitted 10 times, 10 response signals are captured and 10 ear canal responses are estimated. 10 feature vectors ("ear prints") are extracted from the 10 ear canal responses. A target user model is built from the 10 ear prints. In a simple case, the target user model may be an average of the 10 ear prints. Such a simple model is known as a template. The target model is saved along with its associated fit metric, which in this case is (L=1 mm,Theta=45 degrees). One of the parameters of the fit metric is adjusted, for example, L=2 mm and the same process is repeated to obtain a target user model for fit metric (L=2 mm,Theta=45 degrees), which is again stored along with its associated fit metric.

In a case where two different features are extracted for each fit metric, each target model user set would include a target user model for a first feature, for example, resonance frequency, and a target user model for a second feature, for example, frequency response for a particular frequency range.

An example verification or authentication process would involve the user fitting the personal audio device to their ear. An acoustic stimulus is emitted once, a response signal is captured and an ear canal response is estimated. A feature vectors ("ear print") is extracted from the ear canal response. The fit vector is estimated and used as a selection parameter, to fetch the associated target user model from memory. For example, where the fit metric is estimated to be (L=2 mm,Theta=45 degrees), the target user model associated with that fit metric is fetched. If the target user model is a simple model, such as a template, the similarity between the fetched target user model and the estimated feature is determined and if similar enough, the user is authenticated. If the target user model is a more complex model, the likelihood of the estimated feature being generated by the fetched user model is determined. At the same time, the likelihood of the estimated feature being generated by a non-target user model is also determined. The ratio of this likelihood determines whether the user is authenticated.

Embodiments of the disclosure thus provide methods, apparatus and systems for authenticating a user. Embodiments of the disclosure further provide methods, apparatus and systems for authenticating a user.

Embodiments described above have focussed on an implementation in which ear biometrics and/or voice biometrics are performed on signals detected in a single ear. It will be appreciated by those skilled in the art that the embodiments may straightforwardly be adapted to take into consideration biometric data obtained from both ears of a user. Thus, where the description above discloses acquiring data from an ear (e.g. through application of an acoustic stimulus and detection of the response, or acquisition of a bone-conducted voice signal in the ear), data may similarly be acquired from two ears. For example, the system 300 described above may comprise respective signal processing chains for data from each ear (e.g. respective ADCs, ear canal response modules, and/or feature extract modules), or a single signal processing chain which is multiplexed between data streams generated within each ear. Biometric algorithms may similarly be performed on data from both ears, and this may be combined as described above, i.e. separate biometric authentication scores combined to form a combined score on which an overall decision is determined, or separate biometric authentication decisions which are then combined to determine an overall decision.

Embodiments may be implemented in an electronic, portable and/or battery powered host device such as a smartphone, an audio player, a mobile or cellular phone, or a handset. Embodiments may be implemented on one or more integrated circuits provided within such a host device. Embodiments may be implemented in a personal audio device configurable to provide audio playback to a single person, such as a smartphone, a mobile or cellular phone, headphones, earphones, etc., see FIGS. 1a to 1e. Again, embodiments may be implemented on one or more integrated circuits provided within such a personal audio device. In yet further alternatives, embodiments may be implemented in a combination of a host device and a personal audio device. For example, embodiments may be implemented in one or more integrated circuits provided within the personal audio device, and one or more integrated circuits provided within the host device.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims or embodiments. The word "comprising" does not exclude the presence of elements or steps other than those listed in a claim or embodiment, "a" or "an" does not exclude a plurality, and a single feature or other unit may fulfil the functions of several units recited in the claims or embodiments. Any reference numerals or labels in the claims or embodiments shall not be construed so as to limit their scope.

Although the present disclosure and certain representative advantages have been described in detail, it should be understood that various changes, substitutions, and alterations can be made herein without departing from the spirit and scope of the disclosure as defined by the appended claims or embodiments. Moreover, the scope of the present disclosure is not intended to be limited to the particular embodiments of the process, machine, manufacture, compositions of matter, means, methods, or steps, presently existing or later to be developed that perform substantially the same function or achieve substantially the same result as the corresponding embodiments herein may be utilized. Accordingly, the appended claims or embodiments are intended to include within their scope such processes, machines, manufacture, compositions of matter, means, methods, or steps.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A method for authenticating a user, the method comprising:
   obtaining ear biometric data for a user to be authenticated, the ear biometric data comprising one or more features characteristic of the user's ear canal and an associated fit metric indicative of a positioning of a personal audio device relative to the user's ear canal, the personal audio device comprising a transducer for application of acoustic stimulus to the user's ear to obtain the ear biometric data;
   determining the one or more features and the associated fit metric from the ear biometric data; and
   identifying the user as a particular authorised user using both the determined one or more features and the determined associated fit metric;
   wherein identifying the user as a particular authorised user based on the one or more features and the associated fit metric comprises:
      determining a target user model set from a plurality of target user model sets based on the fit metric, each target user model set being associated with a particular fit metric of a set of fit metrics and comprising at least one target user model;
      determining one or more target user similarity scores indicative of the similarity of the one or more features to a corresponding target user model of the determined target user model set;
      determining a non-target user model set from a plurality of non-target user model sets based on the fit metric, each non-target user model set being associated with a particular fit metric of a set of fit metrics and comprising a plurality of non-target user models;
      determining a plurality of non-target user similarity scores, each indicative of the similarity of the one or more features to a respective non-target user model of the plurality of non-target user model of the determined target user model set; and
      adjusting the one or more target user similarity scores based on the plurality of non-target user similarity scores.

2. The method of claim 1, wherein obtaining ear biometric data for the user to be authenticated comprises:
   initiating one or more acoustic stimulus for application to the user's ear;
   extracting the one or more features from a measured response to each of the one or more acoustic stimulus.

3. The method of claim 1, wherein extracting the one or more features from the measured response comprises extracting at least one feature from a transfer function between the acoustic stimulus and the measured response.

4. The method of claim 2, further comprising determining the fit metric from the measured response or from the extracted one or more features.

5. The method of claim 1, further comprising determining the fit metric from a signal received from an accelerometer, a gyroscope, a magnetometer, and/or an in-ear detect module.

6. The method of claim 1, wherein identifying the user as a particular authorised user based on the one or more features and the associated fit metric comprises:
   determining a target user model set from a plurality of target user model sets based on the fit metric, each target user model set being associated with a particular fit metric of a set of fit metrics and comprising at least one target user model; and
   determining that at least one of the one or more features is sufficiently similar to a corresponding target user model of the determined target user model set.

7. The method of claim 1, wherein identifying the user as a particular authorised user based on the one or more features and the associated fit metric comprises:
   providing the one or more features and the associated fit metric as an input to a trained machine learning model;
   wherein the trained machine learning model is configured to:
      determine a score indicative of the relative similarity of the extracted one or more feature(s) to respective feature(s) of target models of a target user model set associated with the particular fit metric; and
      output a biometric result based on the score.

8. A method of enrolling a user in a biometric authentication system, the method comprising:
   obtaining ear biometric data for a user to be enrolled in the biometric authentication system, the ear biometric data comprising one or more features characteristic of the user's ear canal and an associated fit metric, the fit metric being indicative of a positioning of a personal audio device relative to the user's ear canal, the personal audio device comprising a transducer for application of acoustic stimulus to the user's ear to obtain the ear biometric data; and
   determining a plurality of target user model sets based on the ear biometric data, each target user model set being associated with a particular fit metric of a set of fit metrics and each target user model set comprising one or more target user models based on respective one or more features for the particular fit metric, wherein at least one of the target user model sets is associated with the determined associated fit metric and the one or more target user models of the at least one of the target user model set are based on the respective determined one or more features;
   wherein a user is identified as a particular authorised user based on user biometric data comprising one or more features and an associated fit metric determined from the user, and the target user model set associated with the associated fit metric determined from the user, wherein identifying the user comprises:
      determining one or more target user similarity scores indicative of the similarity of the one or more features to a corresponding target user model of the determined target user model set;

determining a non-target user model set from a plurality of non-target user model sets based on the fit metric, each non-target user model set being associated with a particular fit metric of a set of fit metrics and comprising a plurality of non-target user models;

determining a plurality of non-target user similarity scores, each indicative of the similarity of the one or more features to a respective non-target user model of the plurality of the non-target user model of the determined target user model set; and adjusting the one or more target user similarity scores based on the plurality of non-target user similarity scores.

9. The method of claim 8, wherein the determined associated fit metric of the biometric data comprises an associated fit metric for each of a plurality of fit metrics, and wherein at least one of the plurality of fit metrics corresponds with a fit metric of the set of fit metrics.

10. The method of claim 8, wherein obtaining ear biometric data for the user to be enrolled comprises:

instructing the user to selectively position a personal audio device relative to the user's ear canal in accordance with one or more fit metrics; and for each of the selected positions, initiating one or more acoustic stimulus for application to the user's ear, extracting the one or more features from a measured response to each of the one or more acoustic stimulus, and determining the associated fit metric.

11. The method of claim 10, further comprising providing feedback to the user to guide the user to position the personal audio device relative to the user's ear canal in accordance with the one or more fit metrics.

12. The method of claim 11, wherein extracting the one or more features from the measured response comprises extracting one or more features from a transfer function between the acoustic stimulus and the measured response.

13. The method of claim 11, further comprising determining the fit metric from the measured response or from the extracted one or more features.

14. The method of claim 8, further comprising determining the fit metric from a signal received from an accelerometer, a gyroscope, a magnetometer, and/or an in-ear detect module.

15. The method of claim 10, wherein at least one of the target user models is derived from one or more features extracted from the measure response.

16. The method of-claim 8, wherein the ear biometric data comprises a plurality of estimates of the one or more features for the associated fit metric, the method further comprising:

determining one or more enrolment sets based on the ear biometric data, each of the one or more enrolment sets comprising the plurality of estimates of the one or more features for a particular fit metric; and determining the one or more target user models of the target user model set for each fit metric based on the enrolment set for the associated fit metric.

17. The method of claim 1, wherein the at least one feature is characteristic of one or more of: (i) the user's ear canal depth; (ii) the user's eardrum impedance; (iii) user's ear canal shape; (iv) ear canal diameter; (v) ear canal size; and (vi) length, distance and angle of first and second bend to eardrum.

18. The method of claim 1, wherein the fit metric comprises one or more of: (i) insertion depth; (ii) orientation angle (azimuth, elevation); (iii) leakage; and (iv) degree of blocking of pressure relief port.

19. A biometric authentication apparatus, comprising:

a biometric module for performing a biometric process;

a stimulus module for generation of an acoustic stimulus;

a transducer for application of the acoustic stimulus to a user's ear, a microphone for detecting a response signal of the user's ear to the acoustic stimulus;

a feature extraction module for extracting from the response signal one or more features characteristic of the user's ear canal for use in a biometric process; and a fit measure module for determining a fit metric associated with the one or more features;

wherein the biometric module is configured to identify the user as a particular authorised user using both the determined one or more features and the determined associated fit metric by:

determining a target user model set from a plurality of target user model sets based on the fit metric, each target user model set being associated with a particular fit metric of a set of fit metrics and comprising at least one target user model;

determining one or more target user similarity scores indicative of the similarity of the one or more features to a corresponding target user model of the determined target user model set;

determining a non-target user model set from a plurality of non-target user model sets based on the fit metric, each non-target user model set being associated with a particular fit metric of a set of fit metrics and comprising a plurality of non-target user models;

determining a plurality of non-target user similarity scores, each indicative of the similarity of the one or more features to a respective non-target user model of the plurality of the non-target user model of the determined target user model set; and adjusting the one or more target user similarity scores based on the plurality of non-target user similarity scores.

* * * * *